(12) United States Patent
Schmitz et al.

(10) Patent No.: US 12,208,557 B2
(45) Date of Patent: Jan. 28, 2025

(54) METHOD FOR CONTROLLING AN EDGE SECTION OF A FILM TRACK

(71) Applicant: Windmöller & Hölscher KG, Lengerich (DE)

(72) Inventors: Torsten Schmitz, Lengerich (DE); Waldemar Colell, Lengerich (DE); Bernd-Alexander Groepper, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 186 days.

(21) Appl. No.: 17/287,269

(22) PCT Filed: Nov. 5, 2019

(86) PCT No.: PCT/EP2019/080250
§ 371 (c)(1),
(2) Date: Apr. 21, 2021

(87) PCT Pub. No.: WO2020/094644
PCT Pub. Date: May 14, 2020

(65) Prior Publication Data
US 2021/0394418 A1    Dec. 23, 2021

(30) Foreign Application Priority Data

Nov. 6, 2018 (DE) .................... 10 2018 127 672.9

(51) Int. Cl.
*B29C 48/92*    (2019.01)
*B29C 48/08*    (2019.01)
(Continued)

(52) U.S. Cl.
CPC .............. *B29C 48/92* (2019.02); *B29C 48/08* (2019.02); *B29C 48/31* (2019.02);
(Continued)

(58) Field of Classification Search
None
See application file for complete search history.

(56) References Cited

U.S. PATENT DOCUMENTS

2003/0050717 A1    3/2003    Hirata et al.
2010/0143530 A1    6/2010    Park et al.

FOREIGN PATENT DOCUMENTS

DE      102016112121 A1    1/2018
EP          2837484 A1     2/2015
(Continued)

OTHER PUBLICATIONS

Machine translation Ito et al. (JP H11-77805A) . . . (Year: 1997).*
(Continued)

*Primary Examiner* — Robert J Grun
(74) *Attorney, Agent, or Firm* — Christian S. Hans; Peter W. Schroen; Bret E. Field

(57) ABSTRACT

The invention relates to a method of controlling an edge section (RA) of a film track (FB) in a flat film machine (100), comprising the following steps:
acquiring a thickness profile (DP) in at least one edge section (RA) of the film track (FB) in a transverse direction (QR) transverse to the production direction (PR) of the film track (FB),
comparing at least a partial section of the acquired thickness profile (DP) of the edge section (RA) with a preset profile (VP),
determining a profile deviation (PA) as a result of the comparison,
performing a controlling intervention on the flat film machine (100) based on the determined profile deviation (PA).

13 Claims, 5 Drawing Sheets

Figure 3:
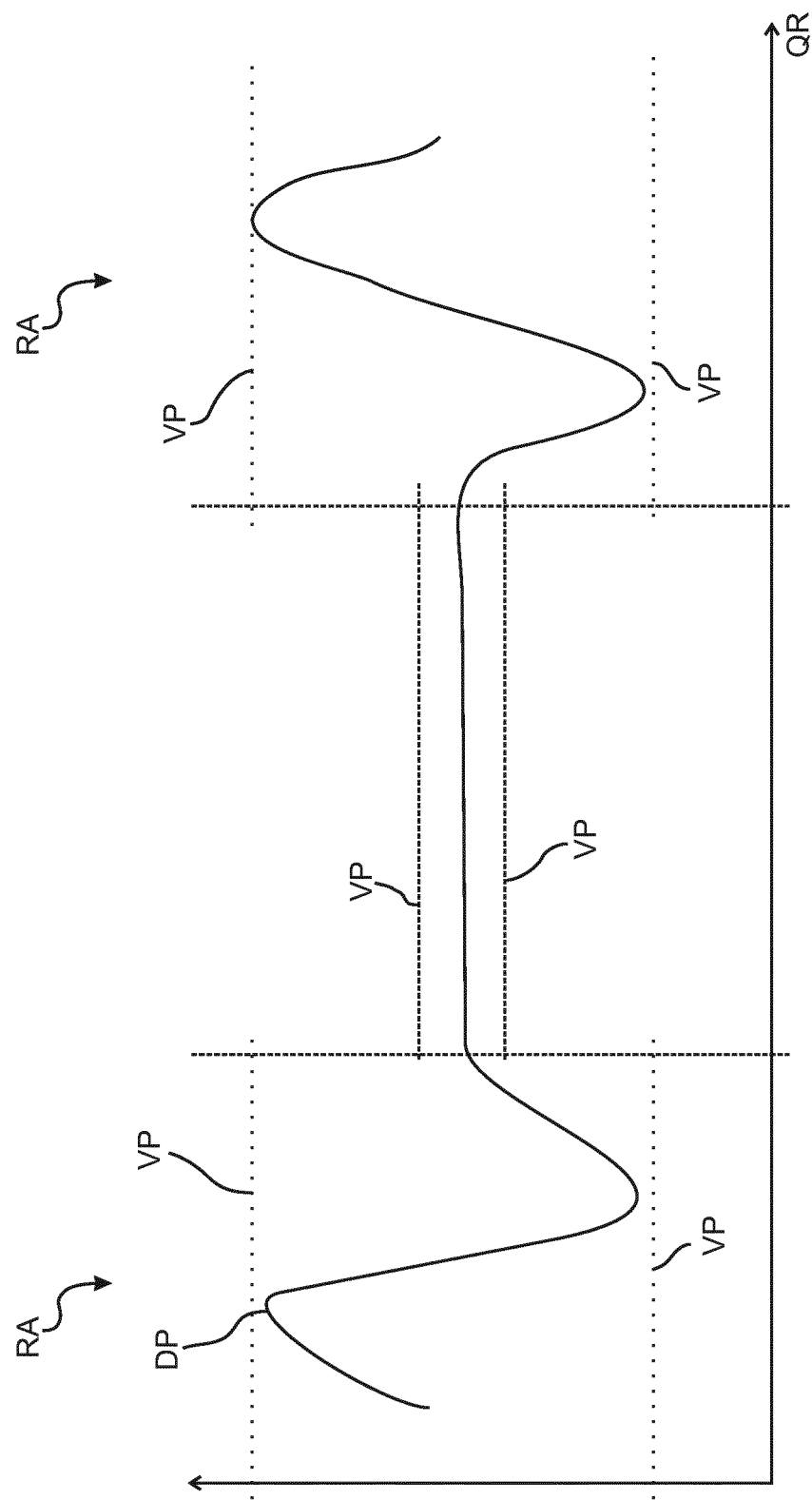

(51) Int. Cl.
    *B29C 48/31*     (2019.01)
    *B29L 7/00*     (2006.01)

(52) U.S. Cl.
    CPC ............... *B29C 2948/92152* (2019.02); *B29C 2948/92209* (2019.02); *B29C 2948/92647* (2019.02); *B29L 2007/008* (2013.01)

(56) References Cited

FOREIGN PATENT DOCUMENTS

| | | |
|---|---|---|
| JP | H11-77805 A | 3/1999 |
| JP | 2002172679 A | 6/2002 |

OTHER PUBLICATIONS

Office Action for German Application No. 102018127672.9 mailed Jul. 3, 2019, with its English translation, 6 pages.
International Preliminary Report on Patentability for PCT Application No. PCT/EP2019/080250 mailed May 11, 2021, 7 pages.
Office Action for German Application No. 10 2018 127 672.9 mailed on Oct. 25, 2022, with its English summary, 5 pages.
Office Action for Chinese Application No. 201980069850.8 mailed on Oct. 17, 2022, with its English summary, 9 pages.
Second Office Action for Chinese Application No. 201980069850.8 mailed on May 4, 2023, with its English Translation, 18 pages.
Rejection of Decision for Chinese Application No. 201980069850.8 mailed on Jul. 28, 2023, with its English Translation, 14 pages.
Office Action for European Application No. 19798301.8 mailed on Jul. 25, 2023, with its English Translation, 10 pages.

\* cited by examiner

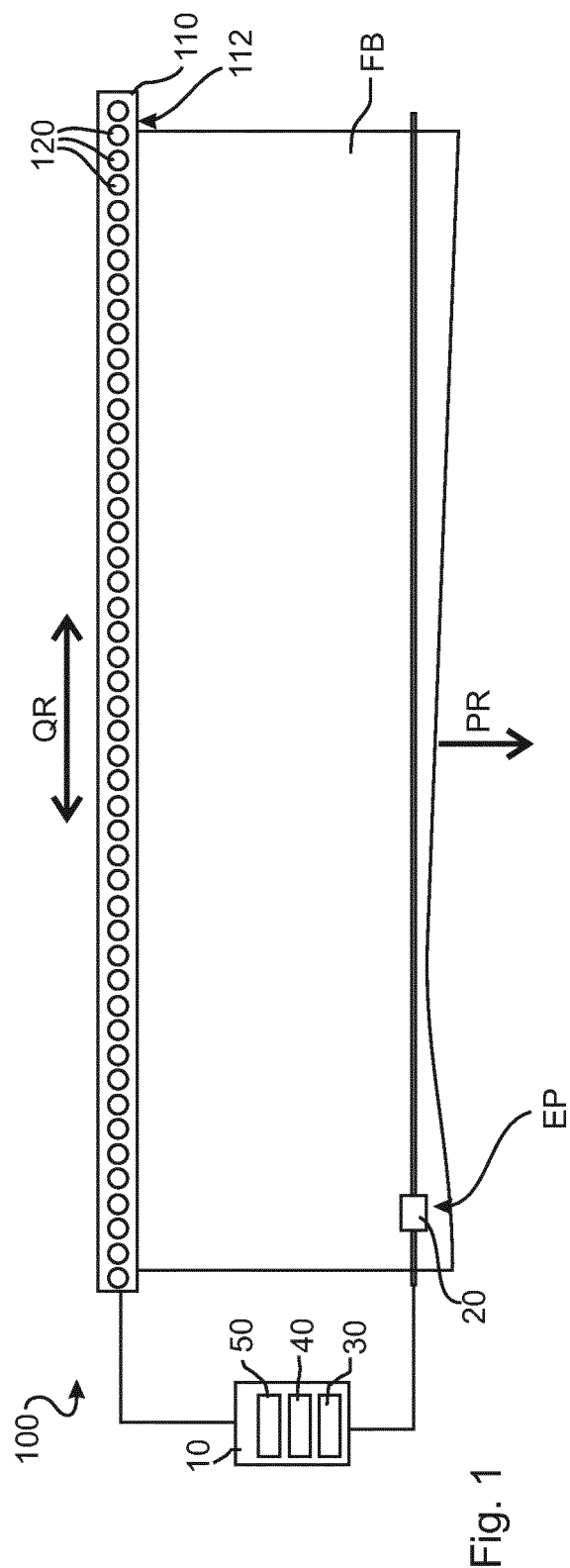
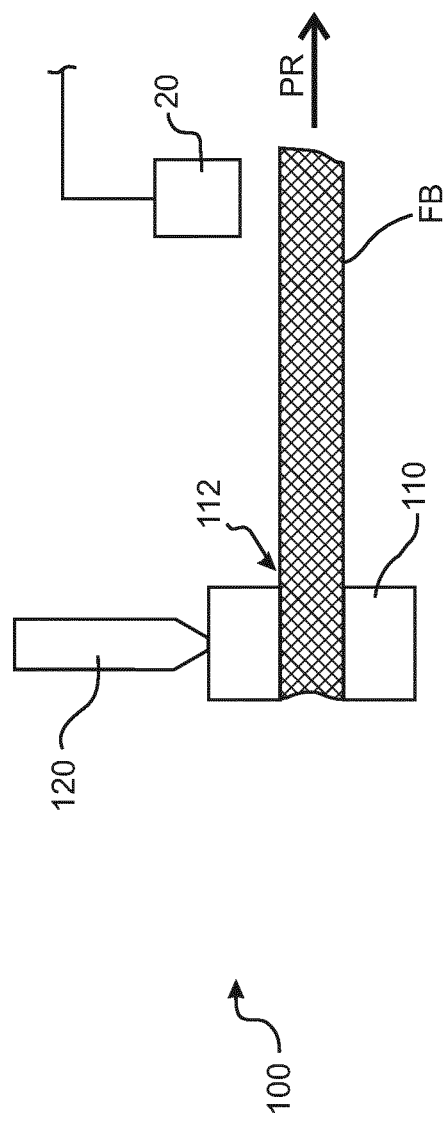
Fig. 1
Fig. 2

METHOD FOR CONTROLLING AN EDGE SECTION OF A FILM TRACK

The present invention relates to a method for controlling an edge portion of a film track in a flat film machine, and to a controlling device for carrying out such a method.

It is known that flat film machines are used to produce film products in the form of a flat film track. With the aid of a plurality of extrusion devices, a material composition is made available for different layers of the film track. In the form of a melt with a defined layer distribution, this material composition is discharged via a discharge nozzle and there from a nozzle slot, and can provide the film track over its entire width. When discharging the nozzle slot, the film track is still liquid or flowable. For the further production process in the production direction, the film track is cooled by a cooling roller and then guided over several rolls to a winding shaft, where it is rolled up. For the stability of production, as well as for some quality parameters, it is crucial that the edge region of the film track adheres to defined limits. While the thickness profile of the film track is usually monitored in a so-called net region in known methods, the edge region essentially plays a role exclusively for production stability. Accordingly, this edge region can have a significantly more variable thickness profile, as these edge regions are cut off in a subsequent step to the production of the film track. Depending on the material composition of the film track, these edge trims are either a waste product or can be returned to the extrusion devices. In addition, it is also possible to coat or laminate the melt. For example, one or more flat tracks can be fed to the melt for this purpose.

The disadvantage of the known solutions is that the thickness profile is only regulated in the so-called net region, i.e. in the region of the film track that is to be made available later as a product. The edge region is usually not considered or, if at all, only manually. In most cases, the edge region is neither monitored by sensors nor manually. This leads to the fact that for the production stability the influence of the edge sections is subordinated or not considered at all. If this edge stability is taken into account at all, this is done on the basis of the knowledge of the operating personnel, and thus cannot be adjusted in a reproducible manner with regard to the influence on the quality of the film product, as well as on the stability of the production. This can lead to the fact that with new machines or inexperienced operating personnel the production stability suffers and it comes to the film break or to reduced quality of the film track and thus to massive restrictions in the economic efficiency of the operation of the flat film machine.

It is an object of the present invention to at least partially overcome the disadvantages described above. In particular, it is an object of the present invention to provide stable production, preferably in reproducible controlling, in a cost-effective and simple manner.

The foregoing object is solved by a method with the features of claim 1 and a controlling device with the features of claim 12. Further features and details of the invention result from the dependent claims, the description and the figures. Features and details described in connection with the method according to the invention naturally also apply in connection with the controlling device according to the invention and vice versa in each case, so that reference is or can always be made mutually with respect to the disclosure of the individual aspects of the invention.

According to the invention, a method of controlling an edge section of a film track in a flat film machine is used. For this purpose, the method comprises the following steps:

acquiring a thickness profile in at least one edge section of the film track in a transverse direction transverse to the production direction of the film track, comparing at least a partial section of the acquired thickness profile of the edge section with a preset profile, determining a profile deviation as a result of the comparison, performing a controlling intervention on the flat film machine based on the determined profile deviation.

A method according to the invention can be provided in addition or as an alternative to the known regulation methods for the thickness profile of the film track in the net region. However, the edge stability can also be controlled separately with a method according to the invention independently of a basic thickness regulation in the net region. The core idea of the invention is the automated or at least partially automated inspection of the at least one edge section. The film track comprises a continuous edge section on both sides, which also extends along the production direction PR. The two edge sections, i.e. the left-hand edge section and the right-hand edge section, enclose the film track, i.e. its net region, on discharge and after discharge from the nozzle slot in the transverse direction of the film track. The thickness profile can be acquired directly or indirectly, for example by acquiring a temperature profile. In particular, the thickness profile can also be acquired directly or indirectly for the region of the melt up to solidification.

The edge sections serve to ensure a certain stability of the production output during production, as well as a quality in the production section, i.e. the net width of the film track. In order to ensure a constant or essentially constant thickness profile, particularly in the net width of the film track, significantly greater fluctuations in thickness and, in particular, a combination of a thick spot and a thin spot are provided in the edge sections or predetermined by the process. From the outside inwards, this means that the edge section starts with a thick spot, which is followed inwards in the transverse direction by a subsequent thin spot. Following the combination of thick spot and thin spot is a net section or net width of the film track with an essentially constant thickness profile. On the opposite side, in the right-hand edge section, there is a further reduction in thickness into a corresponding thin spot with an adjacent thick spot, which in combination now form the opposite edge section.

According to the invention, the thickness profile in at least one of these edge sections is now monitored in a first step. The thickness profile can be acquired over the entire edge section or only over a partial region of this edge section. The acquired thickness profile can be compared with a preset profile. Here, too, it may be sufficient to compare a part of this edge section with a corresponding preset profile. This preset profile can, for example, be determined once when setting up a new product and stored for this product and/or a group of products. However, it is preferred if the entire or substantially the entire edge section is compared with one or more preset profiles. For example, in the case of particularly thick films, particular attention can be paid to the partial section with the corresponding thick spot of the edge section. In the case of particularly thin films, the part with the greatest damaging effect is the thin spot of the edge section, so that it is precisely this part with a corresponding preset profile that is considered in the method according to the invention.

Based on the correlation and comparison between the acquired thickness profile in at least one section and the preset profile, a profile deviation can be generated. The profile deviation can lie within or leave predefined limits.

For example, the preset profile can be a single profile line, with permissible and impermissible profile deviations being defined. This results in a corridor, so to speak, for the thickness profile in the respective partial section, which ensures good or sufficient production stability. As soon as the thickness profile in at least one of these partial sections shows a profile deviation that is too large when compared with the preset profile, i.e. leaves the specified corridor of the preset profile, a controlling intervention can be performed on the film machine in the final step.

The preceding basic mode of operation of a method according to the invention will be explained in more detail by means of an example. If, for example, the production of the film track involves a relatively thin film, there is a risk that a stable edge may become unstable due to an excessively thin spot in the edge section. In other words, it can happen that in the course of the production method, due to production parameters or environmental parameters, the thin spot of the edge section is further reduced, and here destabilization in this edge section is the result. In addition to an undesirable effect on the stretch ratio, which will be explained later, when the film is pulled out of the nozzle slot, this can also lead to stability collapsing in the worst case and the complete film track breaking off during production. This is therefore a profile deviation with a corresponding potential for damage, which makes a controlling intervention necessary when the thickness profile is acquired and a permissible profile deviation defined by the preset profile is exceeded. If the thickness at this thin spot falls below the preset profile, i.e. if the profile deviation is too large and exceeded in an inadmissible manner, a counteraction can be generated by a controlling intervention, for example by an adjustment of adjusting means, in particular in the form of thermal bolts at the discharge nozzle. Thus, directly in the edge section, an opening of corresponding adjusting means can cause more melt material to discharge due to an enlarged nozzle slot in this region, in order to stabilize the edge section by supplying the thin spot with additional melt material. An adjacent regulation is also conceivable, of course, so that the controlling intervention brings about a corresponding balancing effect by moving melt from adjacent regions into the thin spot of the edge section accordingly. In the same way, if the thick spot in the edge section is too thick, this can also affect the quality and stability. This is therefore also a defect spot with potential for damage. By receiving melt in neighboring regions and/or shifting it into these neighboring regions, such a defect spot can also be effectively counteracted.

As can be seen from the preceding example, a regulation of the edge section can now be explicitly provided in comparison to the known solutions of the prior art. Thus, an additional quality criterion of the film track, and in particular also an additional stability criterion of the production method can be incorporated into the controlling of the flat film machine. In other words, it is now possible, in addition, separately or alternatively to a controlling or a regulation of the thickness profile in the net region of the film track, to also monitor the stability of the production in an automated or partially automated manner. Since the method according to the invention can be carried out in an automated or partially automated manner, reproducible results can also be achieved here, which are in particular independent of the level of experience of the operating personnel.

It can also be advantageous if, in a method according to the invention, the steps of acquiring, comparing, determining and performing the controlling intervention are carried out on both sides of both edge sections of the film track. As has already been explained, the net width of the film track is terminated on both sides by a corresponding edge section or is laterally limited in the transverse direction. The fact that the method according to the invention is now carried out on both sides means that the corresponding advantages in terms of production quality and production stability are also made available for both sides of the film track. The method can be carried out both sequentially and in parallel or at least partially in parallel for the two edge sections. In particular, as will be explained later, the monitoring on both sides is symmetrical in order to be able to achieve the advantages of the invention for the entire film track.

In an embodiment example according to the preceding paragraph, it brings further advantages if the method steps are carried out for identical or essentially identical, in particular symmetrical or essentially symmetrical, edge sections of the film track. Of course, the film track may have a wide variety of edge sections. However, for a symmetrical omission, in particular a symmetrical manufacturing quality as well as manufacturing stability, it is advantageous if a symmetrical boundary is provided on the two sides in the transverse direction for the film track. Thus, the method according to the invention preferably also refers to equal or symmetrical edge sections with regard to the geometrical alignment, as well as with regard to a corresponding controlling. In other words, symmetrical or equal design of the two edge sections can avoid or at least reduce asymmetrical production along the production direction or asymmetrical warpage. The symmetry preferably refers to a center line of the film track or the net film track with regard to an alignment along the production direction.

Furthermore, it is advantageous if identical or essentially identical, in particular symmetrical or essentially symmetrical, preset profiles are used for both edge sections in a method according to the invention. As has already been explained in the preceding paragraph, symmetrical consideration of the two edge sections leads to symmetrical production stability. The same applies, of course, to the corresponding preset values in the form of the preset profiles, which are a basis for the controlling according to the invention. The identical or symmetrical design thus further stabilizes the symmetrical design of the edge sections. Production stability and also production quality can be further increased in this way. As has also been explained in the preceding paragraph, undesirable lateral warpage or asymmetrical warpage can be reduced or even completely avoided in this way.

A further advantage is achieved if, in a method according to the invention, the acquired thickness profile, the determined profile deviation and/or the performed controlling intervention is applied to an opposite edge section. This refers in particular to a solution in which symmetrical preset profiles and/or symmetrical edge sections are considered. This allows, when monitoring a single edge section, to apply the corresponding information directly or indirectly to the opposite edge section. In particular, the controlling interventions for the two edge sections include the information of the opposite edge section, so that with reduced computational effort a transverse influence along the transverse direction between the individual edge sections can also be taken into account. This makes it possible to further improve production stability and, in particular, to avoid or reduce undesirable swinging or oscillation of a controlling intervention back and forth between the two edge sections.

It is also advantageous if, in a method according to the invention, the controlling intervention is qualitatively and/or quantitatively based on the determined profile deviation. A qualitative controlling intervention therefore means that, for example, if the thin spot is too thin, the controlling intervention qualitatively supplies this thin spot with additional melt material. In a qualitative manner, if the thick spot is too thick, the regulation of the controlling intervention will lead to melt material being removed here and distributed laterally in a transverse manner in order to reduce the thick spot again, which is too thick. If, in addition, a quantitative design of the controlling intervention is carried out, the degree of the profile deviation is used in a quantitative manner as a basis for the quantitative design of the controlling intervention. Of course, the two variants, i.e. a qualitative and/or quantitative design of the controlling intervention in each case can also be used in parallel or sequentially in terms of time or location. This makes it possible to choose between a qualitative or an increased or reduced quantitative controlling intervention, depending on the degree of the profile deviation.

A further advantage can be achieved if, in a method according to the invention, the method steps are carried out during the performance of a production of a feed product. In order to produce a film product in a quality that is ready for sale, the feed product is kept in a production process that is as static as possible. This refers in particular to the production parameters, the material composition and the layer distribution as well as other product parameters of the feed product. In this normal production situation of the flat film machine, therefore, normal production monitoring can take place, which is supplemented and improved by a method according to the invention with respect to stability control and quality control. It is readily apparent here that the method according to the invention is or can be used ideally as a supplement to the known thickness regulation in the net region of the film track.

It is further advantageous if, in a method according to the invention, the method steps are carried out during a changing from a feed product to a follow-on product on the flat film machine. In addition to a normal production of a feed product, the flat film machine must carry out a large number of changing steps when changing between different film products. This may involve a change in material composition, layer distribution, or even a change in format, in particular the width of the film track or the desired thickness of the film track. For this changing, the flat film machine continues to be operated until the changing has taken place and now, with further good production, the follow-on product can be finished as a new feed product. Preferably, the method according to the invention is also used during this changing, so that the advantages according to the invention can also be achieved here with a focus on improved production stability, improved changing stability or, in particular, accelerated changing time.

It is also advantageous if, in a method according to the preceding paragraph, an acquisition position of an acquisition module is changed during the changing. If, for example, the width format of the desired film track is changed, an associated acquisition module can now be adapted and changed to the new local positioning of the edge section. This can be done either by manual movement or shifting or by automated adjustment. The adjustment can be carried out in steps or continuously via the changing process.

It is a further advantage if, in a method according to the invention, the temperature of the film track, in particular in the region of a cooling roller, is monitored in order to acquire the thickness profile. This is, for example, the temperature profile of the film track on the cooling roller. For example, by acquiring a frost line of the film track in connection with the corresponding thickness, an indirect conclusion can be drawn about the thickness profile of the melt from such a temperature profile. Of course, other thickness measurements, for example a transmission measurement or similar measurements, can also be carried out in an alternative or combined manner.

It brings further advantages if, in a method according to the invention, in an outlet section downstream of an outlet nozzle of the flat film machine, a lateral extension change of the at least one edge section is acquired. Also, the location and/or intensity of a pinning device can be taken into account here. This extension change is provided by the solidification of the melt material, in combination with an increased speed difference between the outlet speed and the take-off speed of the film track. This reduction in lateral extension in the transverse direction is also known as neck-in. This lateral extension change can also be acquired by the sensor according to the invention, i.e. as a lateral border of the edge section, and thus also be included in the controlling intervention. The change over time for this lateral border can also be monitored, so that temporal fluctuations, in particular their frequency, can be evaluated with regard to production stability.

Also subject of the present invention is a controlling device for controlling an edge section of a film track in a flat film machine. Such a controlling device comprises an acquisition module for acquiring a thickness profile in at least one edge section of the film track in a transverse direction transverse to the production direction of the film track. Further, a comparison module is provided for a comparison of at least a partial section of the acquired thickness profile of the edge section with a preset profile. Further, the controlling device is provided with a determination module for determining the profile deviation as a result of the comparison. Last but not least, the controlling device comprises an intervention module for performing a controlling intervention on the flat film machine based on the profile deviation. The acquisition module, the comparison module, the determination module and/or the intervention module are thereby advantageously designed for carrying out a method according to the invention. Thus, a controlling device according to the invention has the same advantages as have been explained in detail with reference to a method according to the invention.

Figure 4:
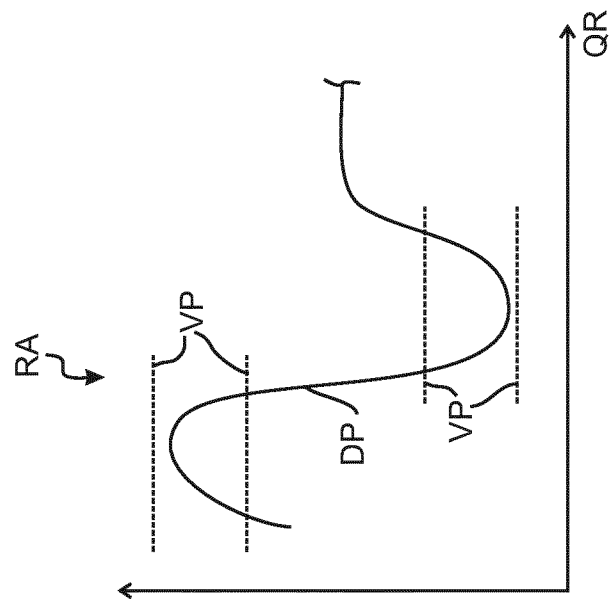
Figure 5:
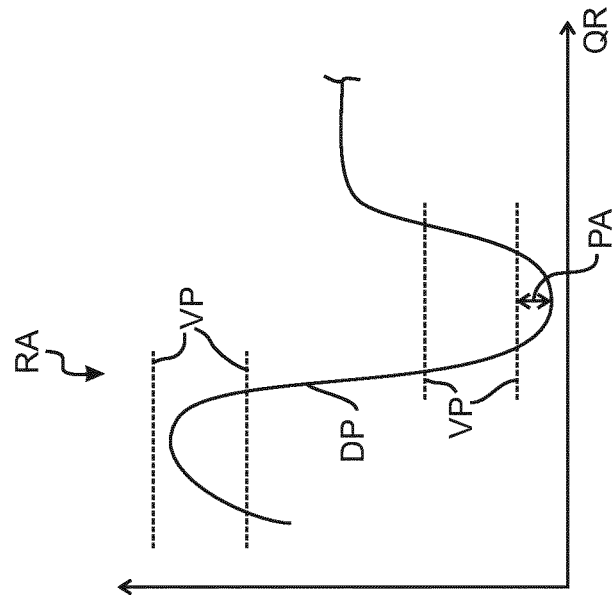
Figure 6:
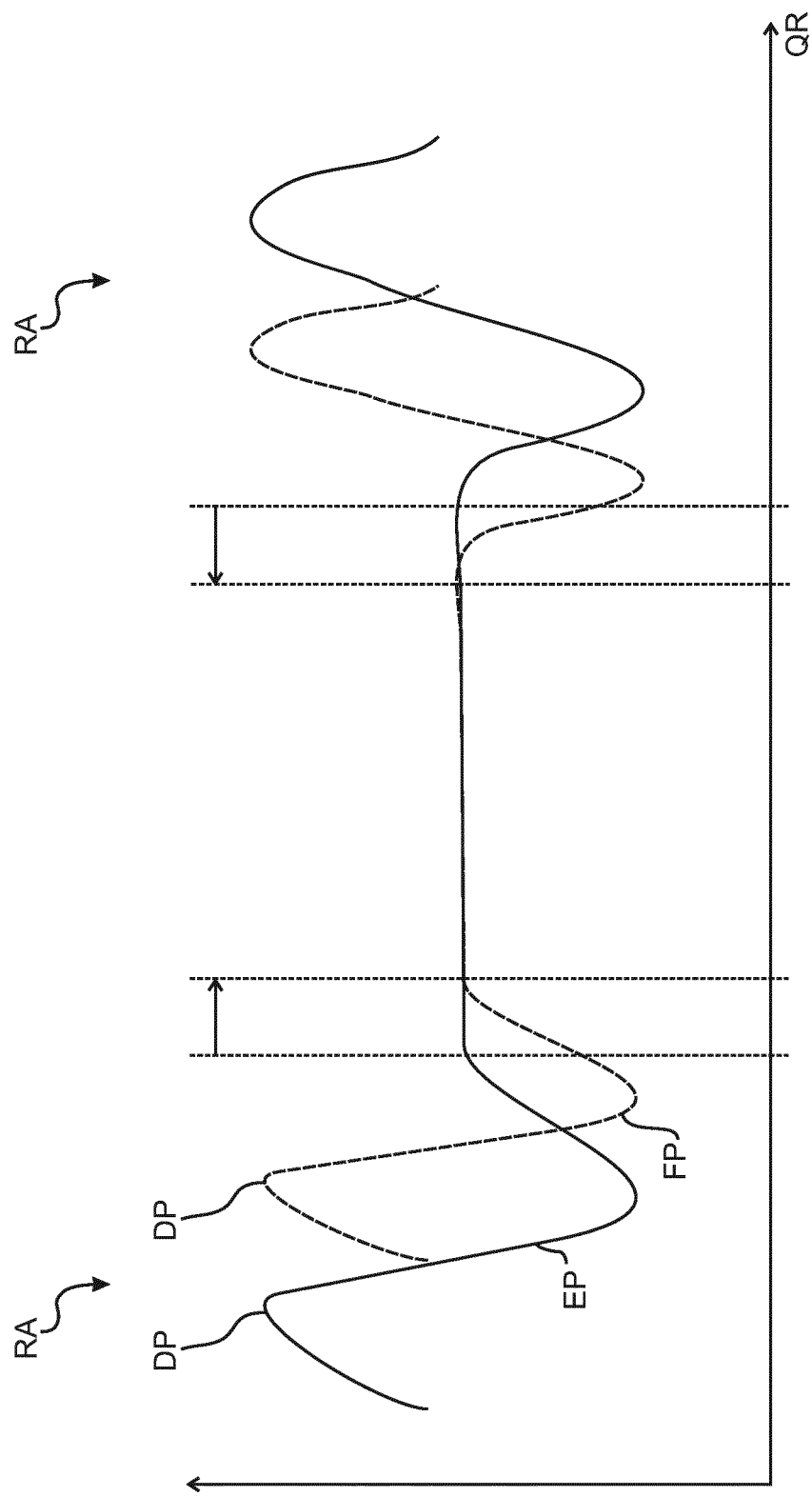
Figure 7:
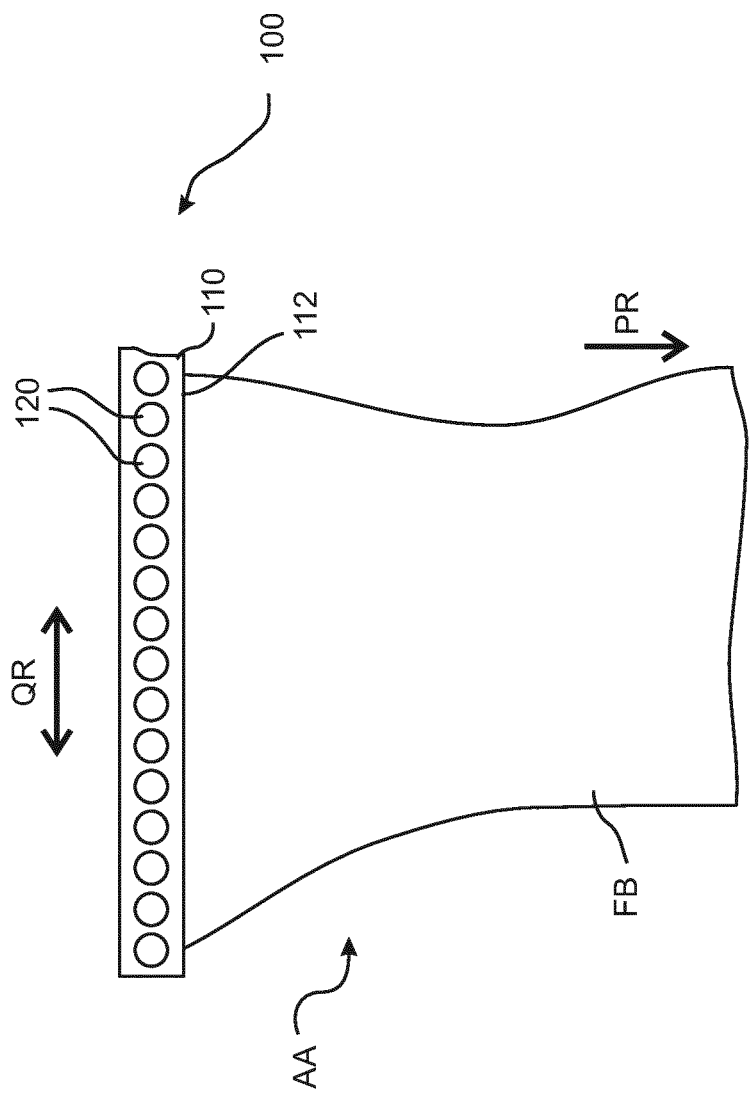

Further advantages, features and details of the invention will be apparent from the following description, in which embodiments of the invention are described in detail with reference to the figures. In this connection, the features mentioned in the claims and in the description may each be essential to the invention individually or in any combination. The figures schematically show:

FIG. 1 an embodiment of a flat film machine with a controlling device according to the invention, FIG. 2 the embodiment of FIG. 1 in a schematic cross-section through the discharge nozzle, FIG. 3 a representation of a thickness profile with two edge sections, FIG. 4 an edge section with permissible thickness profile, FIG. 5 an edge section with a local profile deviation, FIG. 6 a representation of a format change during a changing process and FIG. 7 a representation of a lateral change or necking in the form of a neck-in.

FIGS. 1 and 2 show schematically how a flat film machine 100 can be constructed. A discharge nozzle 110 with an upper and a lower nozzle lip forms a nozzle slot 112 from which material melt is discharged. This material melt solidifies and is thereby formed as the film track FB along the production direction PR (in FIG. 1 directed downwards). In order to vary the nozzle slot 112 with respect to its outlet width or outlet intensity, a plurality of adjusting means 120 are provided. These can be designed, for example, as thermal bolts, i.e. their length can be varied by the application of thermal energy. This makes it possible to provide more or less melt for the production of the film track FB in individual local partial regions. More melt leads to a thicker film track FB at this point, while less melt leads to a thinner film track FB.

A thickness profile DP can now be acquired over the entire width in the transverse direction QR, but at least in the edge sections RA explained later, with the aid of an acquisition module 20. The acquisition module 20 is arranged here in the acquisition position EP, which can preferably be variably adapted to the actually produced format of the film track FB. The acquired thickness profile DP is now processed further in a comparison module 30 of the controlling device 10 and a profile deviation PA can be determined via a determination module 40. Via the intervention module 50, the controlling intervention can now be regulated back to the flat film machine 100, so that the desired controlling result can influence the thickness profile DP in at least one edge section RA via the adjusting means 120.

FIG. 2 shows a side view of the discharge nozzle 110 with the nozzle slot 112. Here it can be clearly seen how a thermal extension of the adjusting means 120 against an abutment, which is not shown, reduces the nozzle slot 112 and thus also reduces the thickness of the film track FB at this point. The changed thickness profile can in turn be sensed via the acquisition module 20 and read into the controlling device 10 as feedback.

FIG. 3 shows schematically how such a thickness profile DP can look. In the middle section, a net region is shown which is considerably shorter than in reality and which shows the film product of the film track FB. Here, very narrow limits are given as a preset profile VP, which can also be used as a normal thickness regulation. Crucial for the present invention are the two edge sections RA on the left and right side of this net region. Here, for example, global preset profiles VP can be preset in order to avoid too thick spots and too thin spots in this edge section of the thickness profile DP. As can also be seen in FIG. 3, the edge sections RA are first provided with a thick spot and then with a thin spot from the outside inwards. Only after this combination of thick spot and thin spot does the thickness profile DP transform into the continuous region of the net width of the film track FB.

FIGS. 4 and 5 show further possibilities of edge sections RA. Here, defined preset profiles VP are specified for individual partial sections of the respective edge section RA. Thus, a separate profile region is specified or permitted here for the respective thick spot and the respective thin spot, in which the maximum and the minimum of the thickness profile DP may move. Whereas in FIG. 4 the thickness profile DP moves within the specified limits of the preset profile VP, the thin spot according to FIG. 5 leaves the preset profile VP in a downward direction. This makes it possible to recognize a local profile deviation PA, i.e. a thin spot that is too thin in this case. A corresponding controlling intervention now makes it possible to provide more material melt at this point in order to ensure that this too thin spot is filled.

FIG. 6 shows a possible changing between a feed product EP and a follow-on product FP. Here it can be seen that the new format of the follow-on product is narrower, and thus also has a narrower net width as well as changed positions of the edge sections RA. For the correlation, an acquisition module 20 can leave the defined acquisition position EP and also move inwards in the representation in the example according to FIG. 6, in order to be able to ensure the monitoring of the edge sections with a high degree of certainty.

FIG. 7 shows that after the flowable discharge from the nozzle slot 112, a so-called neck-in of the film track FB occurs in the discharge section AA. Via the edge section and monitoring, this neck-in in the discharge section can also be monitored, namely as the temporal end of the edge section, i.e. when the thickness profile jumps to zero, i.e. the non-existence of the film track. Thus, a method according to the invention can be applied not only to the actual stability of the thickness, but additionally for a geometrical monitoring of the lateral edge sections and the correlation to the corresponding format.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS 10 controlling device
20 acquisition module
30 comparison module
40 determination module
50 intervention module
100 flat film machine
110 discharge nozzle
112 nozzle slot
120 adjusting means
FB film track
RA edge section
EP feed product
FP follow-on product
EP acquisition position
AA outlet section
QR transverse direction
PR production direction
DP thickness profile
VP preset profile
PA profile deviation

The invention claimed is:

1. A method of controlling an edge section of a film track in a flat film machine, comprising the following steps:
   acquiring a thickness profile in at least one edge section of the film track in a transverse direction transverse to the production direction of the film track,
   comparing at least a partial section of the acquired thickness profile of the edge section with a preset profile,
   determining a profile deviation as a result of the comparison, and
   performing a controlling intervention on the flat film machine based on the determined profile deviation,
wherein the edge section comprises a thick section and a thin section,
wherein the thick section has a thickness being greater than a normal thickness of the film track in a middle section of the film track,
wherein the thin section has a thickness being smaller than the normal thickness of the film track in the middle section of the film track, and wherein different preset profiles are provided for the thick section and the thin section.

2. The method according to claim 1, wherein the steps of acquiring, comparing, determining and performing the controlling intervention are carried out on both sides of both edge sections of the film track.

3. The method according to claim 2, wherein the method steps are carried out for identical or essentially identical edge sections of the film track.

4. The method according to claim 2, wherein the method steps are carried out for symmetrical or essentially symmetrical edge sections of the film track.

5. The method according to claim 2, wherein identical or essentially identical preset profiles are used for both edge sections.

6. The method according to claim 2, wherein symmetrical or essentially symmetrical preset profiles are used for both edge sections.

7. The method according to claim 2, wherein at least the acquired thickness profile, the determined profile deviation or the performed controlling intervention is applied to an opposite edge section.

8. The method according to claim 1, wherein the controlling intervention is at least qualitatively or quantitatively based on the determined profile deviation.

9. The method according to claim 1, wherein the method steps are carried out during the performance of a production of a feed product.

10. The method according to claim 1, wherein an acquisition position of an acquisition module is changed during a changing from a feed product to a follow-on product on the flat film machine.

11. The method according to claim 1, wherein the temperature of the film track is monitored in order to acquire the thickness profile.

12. The method according to claim 1, wherein the temperature of the film track in the region of a cooling roller is monitored in order to acquire the thickness profile.

13. The method according to claim 1, wherein in an outlet section downstream of an outlet nozzle of the flat film machine, a lateral extension change of the at least one edge section is acquired.

* * * * *